(12) United States Patent
Penton et al.

(10) Patent No.: US 8,499,017 B2
(45) Date of Patent: Jul. 30, 2013

(54) APPARATUS AND METHOD FOR PERFORMING FUSED MULTIPLY ADD FLOATING POINT OPERATION

(75) Inventors: Antony John Penton, Cambridge (GB); Simon John Craske, Cambridge (GB); Ian Michael Caulfield, Cambridge (GB)

(73) Assignee: ARM Limited, Cambridge (GB)

( * ) Notice: Subject to any disclaimer, the term of this patent is extended or adjusted under 35 U.S.C. 154(b) by 1022 days.

(21) Appl. No.: 12/461,478

(22) Filed: Aug. 12, 2009

(65) Prior Publication Data

US 2011/0040815 A1 Feb. 17, 2011

(51) Int. Cl.
*G06F 7/00* (2006.01)
*G06F 15/00* (2006.01)

(52) U.S. Cl.
USPC .............................. 708/203; 708/205; 708/207

(58) Field of Classification Search
None
See application file for complete search history.

(56) References Cited

U.S. PATENT DOCUMENTS

2007/0061392 A1* 3/2007 Gerwig et al. ................ 708/523

* cited by examiner

*Primary Examiner* — Scott Sun
(74) *Attorney, Agent, or Firm* — Nixon & Vanderhye P.C.

(57) ABSTRACT

A data processing apparatus is arranged to perform a fused multiply add operation. The apparatus 100 has multiplying circuitry 110 configured to multiply operands B and C to generate a product B*C having a high order portion 160 and a low order portion 170. The apparatus has adding circuitry 130 configured to: (i) add an operand A to one of the high order portion 160 and the low order portion 170 to generate an intermediate sum value; and (ii) add the intermediate sum value to a remaining one of the high order portion 160 and the low order portion 170 to generate a result A+B*C.

32 Claims, 10 Drawing Sheets

US 8,499,017 B2

APPARATUS AND METHOD FOR PERFORMING FUSED MULTIPLY ADD FLOATING POINT OPERATION

FIELD

The present invention relates to the field of data processing. In particular, the invention relates to an apparatus for performing a fused multiply add floating point operation.

BACKGROUND

Processors for performing arithmetic operations on binary floating point numbers are known. In floating point representation, numbers are represented using a mantissa 1.F, an exponent E and a sign bit S. The sign bit S represents whether the floating point number is positive or negative, the mantissa 1.F represents the significant digits of the floating point number, and the exponent E represents the position of the radix point (also known as a binary point) relative to the mantissa. By varying the value of the exponent, the radix point can "float" left and right within the mantissa. This means that for a predetermined number of bits, a floating point representation can represent a wider range of numbers than a fixed point representation (in which the radix point has a fixed location within the mantissa). However, the extra range is achieved at the expense of reduced precision since some of the bits are used to store the exponent. Sometimes, a floating point arithmetic operation generates a result with more significant bits than the number of bits used for the mantissa. If this happens then the result is rounded to a value that can be represented using the available number of significant bits.

FIG. 1 of the accompanying drawings shows how floating point numbers are stored within a register or memory. In a single precision representation, 32 bits are used to store the floating point number. One bit is used as the sign bit S, eight bits are used to store the exponent E, and 23 bits are used to store the fractional portion F of the mantissa 1.F. The 23 bits of the fractional portion F, together with an implied bit having a value of one, make up a 24-bit mantissa 1.F. The radix point is initially assumed to be placed between the implied bit and the 23 stored bits of the mantissa. The stored exponent E is biased by a fixed value 127 such that, if E−127 is negative, then in the represented floating point number the radix point is shifted left from its initial position by a number of places equal to the absolute value of E−127 (e.g. if E−127=−2 then a mantissa of 1.01 represents 0.0101), and if E−127 is positive, then the radix point is shifted right from its initial position by E−127 places (e.g. if E−127=2 then a mantissa of 1.01 represents 101). The bias is used to make it simpler to compare exponents of two floating point values as then both negative and positive shifts of the radix point can be represented by a positive value of the stored exponent E. As shown in FIG. 1, the stored representation S[31], E[30:23], F[22:0] represents a number with the value $(-1)^s*1.F[22:0]*2^{(E-127)}$. A single-precision floating point number in this form is considered to be "normal". If a calculated floating point value is not normal (for example, it has been generated with a mantissa having one or more leading zeros), then it can be normalized, for example by shifting the mantissa left and adjusting the exponent accordingly until the number is of the form $(-1)^s*1.F[22:0]*2^{E-127}$ (floating point numbers can also be "denormalised" in order to place them in a "denormal" form $0.F*2^{-126}$). Exception handling routines and/or hardware can be provided to handle numbers that cannot be represented as a normal floating point value, such as infinity and not-a-number (NaN) values. A special value of the exponent field E (0xFF) can be reserved for such values.

A double precision format is also provided in which the mantissa and exponent are represented using 64 stored bits. The 64 stored bits include one sign bit, an 11-bit exponent and the 52-bit fractional portion F of a 53-bit mantissa 1.F. In double precision format the exponent E is biased by a value of 1023. Thus, in the double precision format a stored representation S[63], E[62:52], F[51:0] represents a floating point value $(-1)^s*1.F[51:0]*2^{E-1023}$.

Hereafter the present invention shall be explained with reference to the single precision floating point format. However, it will be appreciated that the invention could also be applied to the double precision format (or any other floating point format) and that the numbers of bits shown in subsequent figures could be replaced by values appropriate to the floating point format being used.

A commonly used floating point operation is a multiply add operation A+B*C, whereby two operands B and C are multiplied together and the product B*C is added to a third operand A. The multiply add operation can also be referred to as a multiply accumulate operation, since often the result A+B*C is written to the register that contains the operand A. Thus, a series of multiply add operations can be used to accumulate a sum of various products to a destination register.

In floating point processors complying with the IEEE 754-1985 floating point standard, a multiply add operation can be implemented as separate multiply and add operations, including a rounding of the intermediate result. The 1985 standard has now been superseded by the IEEE 754-2008 standard, which as well as supporting the separate multiply and add operations, also provides for a fused multiply add operation in which there is no rounding of the intermediate result. In the fused multiply add operation the overall operation is performed at higher precision as there is no rounding of the intermediate result.

In single precision floating point, the mantissa resulting from the multiplication part of a fused multiply add operation is 48-bits wide. In order to align this with a 24-bit wide addend A, a shifter which is around 48-bits wide is required. To sum the aligned operands, an adder of at least similar width is required. This is in contrast to floating point units performing only simple floating point addition, in which the adders and shifters are only around 24-bits wide for single precision floating point. The wide adders and shifters that are typically used for the fused multiply add represent a significant area overhead, particularly for smaller processors. The present invention seeks to reduce the area overhead required to perform a fused multiply add operation.

SUMMARY

Viewed from one aspect the present invention provides a data processing apparatus for performing a fused multiply add operation on operands A, B and C to generate a result A+B*C, said operands A, B and C and said result A+B*C being floating point values, said data processing apparatus comprising:

multiplying circuitry configured to multiply said operands B and C to generate a product B*C having a high order portion and a low order portion;

adding circuitry configured to:

(i) add said operand A to one of said high order portion and said low order portion to generate an intermediate sum value; and (ii) add said intermediate sum value to a remaining one of said high order portion and said low order portion to generate said result A+B*C.

The present technique recognizes that a fused multiply add operation can be performed using adders and shifters of a similar width to those used to perform simple floating point addition. This is done by splitting the product of operands B and C into a high order portion and a low order portion. In a first addition, operand A is added to one of the high order portion and low order portion to generate an intermediate sum value. Then, in a second addition, the intermediate value is added to a remaining one of the high order portion and the low order portion in order to generate the result A+B*C. By breaking the addition up into stages, adding circuitry of a similar width to that used to perform simple addition can be used to perform the multiply add operation. For example, if single precision is being used, then adding circuitry comprising adders and shifters having a width of approximately 24 bits can be used to add a 48-bit product to a 24-bit addend, while retaining the higher precision associated with the fused multiply add operation. While the present technique achieves this reduction in circuit area at the expense of increased processing time, in many smaller processors the latency required for executing the fused multiply add operation is not critical and reducing the circuit area overhead is more important than reducing the processing time.

Viewed from another aspect, the present technique provides a data processing apparatus for performing a fused multiply add operation on operands A, B and C to generate a result A+B*C, said operands A, B and C and said result A+B*C being floating point values, said data processing apparatus comprising:

multiplying means for multiplying said operands B and C to generate a product B*C having a high order portion and a low order portion;

adding means for:

(i) adding said operand A to one of said high order portion and said low order portion to generate an intermediate sum value; and (ii) adding said intermediate sum value to a remaining one of said high order portion and said low order portion to generate said result A+B*C.

Viewed from a further aspect, the present technique provides a method for performing a fused multiply add operation on operands A, B and C to generate a result A+B*C, said operands A, B and C and said result A+B*C being floating point values, said method comprising the steps of:

multiplying said operands B and C to generate a product B*C having a high order portion and a low order portion;

adding said operand A to one of said high order portion and said low order portion to generate an intermediate sum value; and adding said intermediate sum value to a remaining one of said high order portion and said low order portion to generate said result A+B*C.

Viewed from yet another aspect, the present technique provides a data processing apparatus for performing a fused multiply add operation on operands A, B and C to generate a result A+B*C, said operands A, B and C and said result A+B*C being floating point values, said data processing apparatus comprising:

multiplying circuitry configured to multiply said operands B and C to generate a product B*C having a high order portion and a low order portion; and adding circuitry configured to:

(i) generate a first intermediate value by adding said operand A to said high order portion;

(ii) generate a second intermediate value by adding said operand A to said low order portion;

(iii) select one of said first intermediate value and said second intermediate value; and (iv) generate said result A+B*C by a selected one of a first addition and a second addition:

(a) said first addition comprising adding said first intermediate value to said low order portion and being selected by said adding circuitry if said first intermediate value is selected as said one of said first intermediate value and said second intermediate value; and (b) said second addition comprising adding said second intermediate value to said high order portion and being selected by said adding circuitry if said second intermediate value is selected as said one of said first intermediate value and said second intermediate value.

When the addition of a fused multiply add operation is broken up into two stages, it is possible to carry out the addition in one of two ways. The high order portion of the product could first be added to the addend in order to generate a first intermediate value, and the first intermediate value could then be added to the low order portion of the product in order to generate the result. Alternatively, the low order portion of the product could first be added to the addend in order to generate a second intermediate value, followed by an addition of the second intermediate value and the high order portion of the product in order to generate the fused multiply add result. The present technique recognizes that the preferred order for adding the portions of the products to the addend will depend on the values of the product and the addend and that determining which order is preferred for any particular set of operands is not straightforward. Accurately detecting the order required for a correct operation may require a significant amount of processing time. For this reason, in the present technique, the adding circuitry is configured to generate both the first intermediate value (by adding the operand A to the high order portion of the product B*C) and the second intermediate value (by adding the operand A to the low order portion of the product B*C). Once the intermediate values have been generated, then the adding circuitry can select one of the first intermediate value and the second intermediate value and generate the result by adding the selected intermediate value to the remaining one of the high order portion or low order portion. Calculating both the first intermediate value and the second intermediate value in the first part of the addition, even though only one of these values will be required for the second part of the addition, avoids a delay which would occur if the adding circuitry had to determine the preferred order of addition before generating the appropriate one of the first intermediate value or the second intermediate value.

In a feature of the present technique, the adding circuitry may be configured to generate the first intermediate value and the second intermediate value in a first pass through the adding circuitry and generate the result A+B*C in a second pass through the adding circuitry; the apparatus may comprise forwarding circuitry for forwarding outputs generated in the first pass through the adding circuitry for use as inputs for the second pass through the adding circuitry; and the adding circuitry may comprise at least some circuitry that is used for both the first pass and the second pass.

By reusing at least part of the adding circuitry used for generating the intermediate values to also generate the result, the circuit area required for the data processing apparatus is reduced compared to the case where separate circuitry is used for each step of the addition.

In another feature of the present technique, said data processing apparatus includes rounding circuitry for rounding said result A+B*C to generate a rounded result value having an N-bit mantissa;

said first intermediate value includes an X-bit mantissa representing X high order bits of an M-bit mantissa representing a sum of said high order portion and said operand A, and a jamming bit indicative of whether any of M–X low order bits of said M-bit mantissa have a non-zero value, where M≧X and X≧N;

said second intermediate value includes an X-bit mantissa representing X high order bits of a P-bit mantissa representing a sum of said low order portion and said operand A, and a jamming bit indicative of whether any of P–X low order bits of said P-bit mantissa have a non-zero value, where P≧X; and said result A+B*C includes an X-bit mantissa representing X high order bits of a Q-bit mantissa representing said selected one of said first addition and said second addition, and a jamming bit indicative of whether there is a non-zero value for any of: (i) Q–X low order bits of said Q-bit mantissa; and (ii) said jamming bit of said selected one of said first intermediate value and said second intermediate value, where Q>X.

It is possible that the result A+B*C generated by the data processing apparatus can have a mantissa with more bits than the mantissa of the floating point representation being used by the apparatus. For this reason, the apparatus includes rounding circuitry for rounding the result to generate a rounded result value having a mantissa of the appropriate size (for example, N-bits). One or more intermediate results may also have mantissae with more than N bits. If this is the case, then it is likely that only X highest order bits of the intermediate result(s) will contribute to the final rounded result (where X≧N), and any lower order bits are likely to be discarded by the rounding circuitry. If any of these lower order bits have a non-zero value, then it is an indication that the result cannot be exactly represented by the floating point representation being used and must therefore be rounded either up or down. Otherwise, in the first and second intermediate values and the non-rounded result A+B*C the values of the low order bits are not particularly important. Therefore, these low order bits are replaced in the various intermediate values by a "jamming bit" indicating whether any of the low order bits have a non-zero value. By reducing the low order bits to a single jamming bit, the width of some of the processing paths of the data processing apparatus can be reduced, thus reducing the area overhead associated with the apparatus.

Note that in the above, X>N if a rounding bit and/or a guard bit is appended to the mantissae of the intermediate results (a rounding bit is a bit that helps the rounding circuitry to select whether to round up or down, while a guard bit is a bit that may get shifted into the final result if the result is normalized). If no rounding bit or guard bit is used, then X=N. Note also that where P=X or Q=X, this means there are no P–X or Q–X low order bits being reduced to a jamming bit and so in this case the jamming bit will indicate that there are no non-zero values.

The adding circuitry may be configured to select the one of the first intermediate value and the second intermediate value in dependence on an estimation of whether the operand A and the high order portion have values such that addition of the operand A and the high order portion would result in cancellation of a plurality of high order bits of the operand A and the high order portion. If, when the operand A and the high order portion of the product B*C are added together, a plurality of high order bits are cancelled, then this will result in a plurality of leading zeros in the first intermediate value. This means that normalization may be required, which can affect the preferred order for adding the high and low order portions of the product to the addend A.

The adding circuitry may be configured to select as said one of the first intermediate value and the second intermediate value:

(i) said first intermediate value if it is estimated that said operand A and said high order portion have values such that addition of said operand A and said high order portion would result in cancellation of said plurality of high order bits of said operand A and said high order portion; and (ii) said second intermediate value if said operand A and said high order portion have values such that addition of said operand A and said high order portion would not result in cancellation of said plurality of high order bits of said operand A and said high order portion.

If addition of the operand A and the high order portion would result in cancellation of high order bits, then the first intermediate value will contain several leading zeros and so a left shift may be required to remove the leading zeros. This means bits of the low order portion of the product may be shifted into bit positions that contribute to the final result value. Some of the bits of the low order portion will therefore need to be available at the second adding step. If the addition is carried out such that the low order portion is added to the operand A first, followed by the higher order portion, then it is possible that some of the bits of the low order portion will be lost at the first adding step (since when A+B*C results in cancellation of high order bits the operand A will necessarily be of a greater order of magnitude that the low order portion). Therefore, for values of the operand A and the high order portion for which cancellation of high order bits can occur, it is better to add the high order portion to the operand first, followed by the low order portion. Thus, the adding circuitry is arranged to select the first intermediate value if cancellation of the high order bits is likely, and select the second intermediate value if cancellation would not occur. In situations where cancellation of high order bits cannot occur, it is better to add the low order portion in the first step (as this is more likely to achieve an improved precision in the intermediate result) and add the high order portion at the second adding step.

In a further feature of the present technique, when said product B*C is a normalized floating point value having an exponent with an exponent value $E_{BC}$ and said operand A is a normalized floating point value having an exponent with an exponent value $E_A$, then said adding circuitry is configured to select said one of said first intermediate value and said second intermediate value in dependence on whether or not an absolute difference between said exponent value $E_{BC}$ and said exponent value $E_A$ is greater than an exponent difference threshold.

Cancellation of high order bits of the operand A and the high order portion is most likely when the product B*C and the operand A have exponents of similar values. Therefore, the adding circuitry may be configured to select the one of the first intermediate value and the second intermediate value in dependence on whether or not an absolute difference between the exponents of the operand A and the exponent of the product B*C is greater than an exponent difference threshold. In order to make the comparison of exponents simpler, the product B*C can be generated as a normalized floating point value by the multiplying circuitry (the multiplying circuitry comprising normalizing circuitry for performing the normalization, for example in the form of a leading zeros counter and shifter). The operand A will usually be a normalized floating point value. Although the comparison of exponents does not identify exactly whether cancellation of leading bits will occur (that will also depend on the relative signs and values of the operand A and the product B*C), the comparison of exponents requires less processing overhead than a more accurate determination, and is sufficient for avoiding the problem described above which occurs when leading zeros are produced in the sum of the high order portion and the operand A. When operand A is not a normalized floating point value then the wrong adding order (i.e. the wrong intermediate value) may be selected, leading to a loss of precision. However, the bits which are lost are less significant than can be represented using the floating point format and therefore this makes no difference to the final rounded result. Thus, this method of selecting the appropriate adding order could also be used even if the operand A is not normal.

The apparatus may be arranged so that said adding circuitry is configured to select as said one of said first intermediate value and said second intermediate value:
(i) said first intermediate value if said absolute difference between said exponent value $E_{BC}$ and said exponent $E_A$ value is not greater than said exponent difference threshold; and
(ii) said second intermediate value if said absolute difference between said exponent value $E_{BC}$ and said exponent value $E_A$ is greater than said exponent difference threshold.

Thus, the high order portion is added to the addend at the first adding step if the exponents of the product and the addend are close together (i.e. cancellation of leading bits may, but will not necessarily, occur), while the low order portion is added to the addend in the first adding step if the exponents of the addend and product are further apart than the threshold (i.e. cancellation of leading bits cannot occur).

The exponent difference threshold may be set to be equal to one. If the exponents differ by more than one, then the sum of the high order portion and the operand A will not have more than a single leading zero and so a large amount of shifting of the result will not be required. In such cases, adding the high order portion to the addend at the first adding stage can cause a loss of precision in the event that a chain of carries ripple up from the low order portion to the high order portion, and so it is better to add the low order portion to the addend at the first adding stage. When the exponents differ by zero or one, then the preferred order is to add the high order portion to the addend A to produce the first intermediate stage at the first adding stage, and to add the first intermediate value to the low order portion at the second adding stage.

In a further feature of the present technique, the adding circuitry may comprise a first processing path configured to generate the first intermediate value and a second processing path configured to generate the second intermediate value, the first processing path being configured to operate in parallel with the second processing path. Thus, the low order portion of the product B*C is sent down one of the processing paths of a split path adder, while the high order portion of the product B*C is sent down the other processing path of the adder. Each processing path processes the respective portions in parallel with one another. Thus, the time for executing the fused multiply add operation can be reduced.

The apparatus may be arranged so that:
said first processing path comprises first alignment circuitry for aligning said high order portion and said operand A, a first adder for adding said high order portion and said operand A to generate said first intermediate value, and first normalizing circuitry for normalizing said first intermediate value;
said second processing path comprises second alignment circuitry for aligning said low order portion and said operand A, a second adder for adding said low order portion and said operand A to generate said second intermediate value, and second normalizing circuitry for normalizing said second intermediate value;
said first alignment circuitry has a more limited alignment capability than said second alignment circuitry; and
said second normalizing circuitry has a more limited normalizing capability than said first normalizing circuitry.

The respective circuitry for the first processing path and second processing path does not necessarily have to be the same. Although each path performs alignment, adding and normalizing operations, the alignment and normalizing operations can have different capabilities for each path. For the first processing path, which adds the high order portion to the operand A, the exponents of the high order portion and operand A will be close together if the result of this path is selected, and so the mantissae of these quantities can be aligned using alignment circuitry with only a limited alignment capacity compared with the second alignment circuitry (i.e. the maximum number of places by which the first alignment circuitry can shift the mantissa of the high order portion or operand A is smaller than the maximum number of places by which the second alignment circuitry can shift the mantissa of the low order portion or operand A). On the other hand, for the second processing path a greater alignment capability is needed, but a more limited normalizing capability can be used compared to the first processing path. This is because in the second processing path the generated second intermediate value is unlikely to require a large amount of shifting in order to put it into the form $1.F*2^E$. The second normalizing circuitry can therefore be provided with a more limited normalizing capability than the first normalizing circuitry (i.e. the maximum shift amount of the second normalizing circuitry is smaller than the maximum shift amount of the first normalizing circuitry). The more limited second normalizing circuitry and first alignment circuitry use less circuit area than circuitry having greater shifting capability, and means that the worst-case timing through the adder can be reduced. Therefore, the overall circuit overhead for the fused multiply add unit can be reduced by providing the more limited first alignment circuitry and second normalizing circuitry.

The apparatus may be arranged such that said operands A, B and C each have an N-bit mantissa; said product B*C has a 2N-bit mantissa; and said high order portion and said low order portion each have an N-bit mantissa.

Although it will be appreciated that the higher order portion and lower order portion could have mantissae of different sizes, if a 2N-bit mantissa of the product B*C is divided into a high and low order portion each having an N-bit mantissa, then the addition can be carried out using an adder designed for performing simple floating point addition on operands with N-bit mantissae.

The apparatus may also be arranged so that said operands A, B and C each have an X-bit exponent;
said product B*C, said high order portion and said low order portion each have an (X+1)-bit exponent;
said exponents of said product B*C and said high order portion each have a value E; and
said exponent of said low order portion has a value equal to (E−N).

The value of the exponent of the low order portion is thus adjusted by N relative to the product exponent E in order to ensure that the value of the low order portion is correctly represented when it is separated from the high order portion of the product.

When the present technique is applied to the single precision floating point format, then N=24 and X=8. For double precision floating point, N=53 and X=11. Different values of N and X can be used for other floating point representations.

The adding circuitry may also be used to perform subtraction. The adding circuitry may be configured so that, if one of said product B*C and said operand A represents a negative number, the adding circuitry is configured to:

select, in dependence on an estimate of which of said product B*C and said operand A has a larger absolute value, a subtraction order from one of: product B*C minus operand A, and operand A minus product B*C;

generate said first intermediate value and said second intermediate value in accordance with said selected subtraction order; and perform said selected one of said first addition and said second addition using said selected one of said first intermediate value and said second intermediate value, said selected one of said first intermediate value and said second intermediate value being unchanged between being generated and being used for said selected one of said first addition and said second addition, even if said estimate incorrectly identifies which of said product B*C and said operand A has a larger absolute value.

Floating point subtraction is usually best performed in the order 'larger absolute value minus smaller absolute value', with the sign bit adjusted accordingly. However, a precise calculation of which of the values is larger can take a significant amount of processing. To reduce the amount of processing, the adding circuitry estimates which of the product B*C and the operand A has the larger absolute value, rather than calculating this precisely. The two-step adder of the present technique means that even if the estimation is incorrect and the first or second intermediate value is generated with an incorrectly negative or positive value, this can be accounted for during the second step (since the incorrectly negative or positive value will also have an incorrect sign bit, and so the second step will produce the correct result regardless). Thus, the present technique avoids the need for any negating or processing of the first or second intermediate value between being generated in the first adding step and being used for the second adding step. Thus, the selected intermediate value can be passed unchanged between the first and second adding steps and the amount of processing performed by the adding circuitry can be reduced.

An efficient way of estimating which of the product B*C and addend A has the larger absolute value is to perform the estimation based on a comparison of exponent values of said operand A and said product B*C. Whichever value has a larger exponent will more often than not be the larger number. This method of estimation uses less processing resources than a full comparison of the mantissae and exponents of the product B*C and addend A.

Viewed from another aspect, the present invention provides a data processing apparatus for performing a fused multiply add operation on operands A, B and C to generate a result A+B*C, said operands A, B and C and said result A+B*C being floating point values, said data processing apparatus comprising:

multiplying means for multiplying said operands B and C to generate a product B*C having a high order portion and a low order portion; and adding means for:
(i) generating a first intermediate value by adding said operand A to said high order portion;
(ii) generating a second intermediate value by adding said operand A to said low order portion;
(iii) selecting one of said first intermediate value and said second intermediate value; and
(iv) generating said result A+B*C by a selected one of a first addition and a second addition:
(a) said first addition comprising adding said first intermediate value to said low order portion and being selected by said adding means if said first intermediate value is selected as said one of said first intermediate value and said second intermediate value; and
(b) said second addition comprising adding said second intermediate value to said high order portion and being selected by said adding means if said second intermediate value is selected as said one of said first intermediate value and said second intermediate value.

Viewed from a further aspect, the present invention provides a method for performing a fused multiply add operation on operands A, B and C to generate a result A+B*C, said operands A, B and C and said result A+B*C being floating point values, said method comprising the steps of:

multiplying said operands B and C to generate a product B*C having a high order portion and a low order portion;

generating a first intermediate value by adding said operand A to said high order portion;

generating a second intermediate value by adding said operand A to said low order portion;

selecting one of said first intermediate value and said second intermediate value; and generating said result A+B*C by a selected one of a first addition and a second addition:
(a) said first addition comprising adding said first intermediate value to said low order portion and being selected as said selected one of said first addition and said second addition if said first intermediate value is selected as said one of said first intermediate value and said second intermediate value; and
(b) said second addition comprising adding said second intermediate value to said high order portion and being selected as said selected one of said first addition and said second addition if said second intermediate value is selected as said one of said first intermediate value and said second intermediate value.

The above, and other objects, features and advantages of this invention will be apparent from the following detailed description of illustrative embodiments which is to be read in connection with the accompanying drawings.

DESCRIPTION OF NON-LIMITING EXAMPLE EMBODIMENTS

Figure 1:
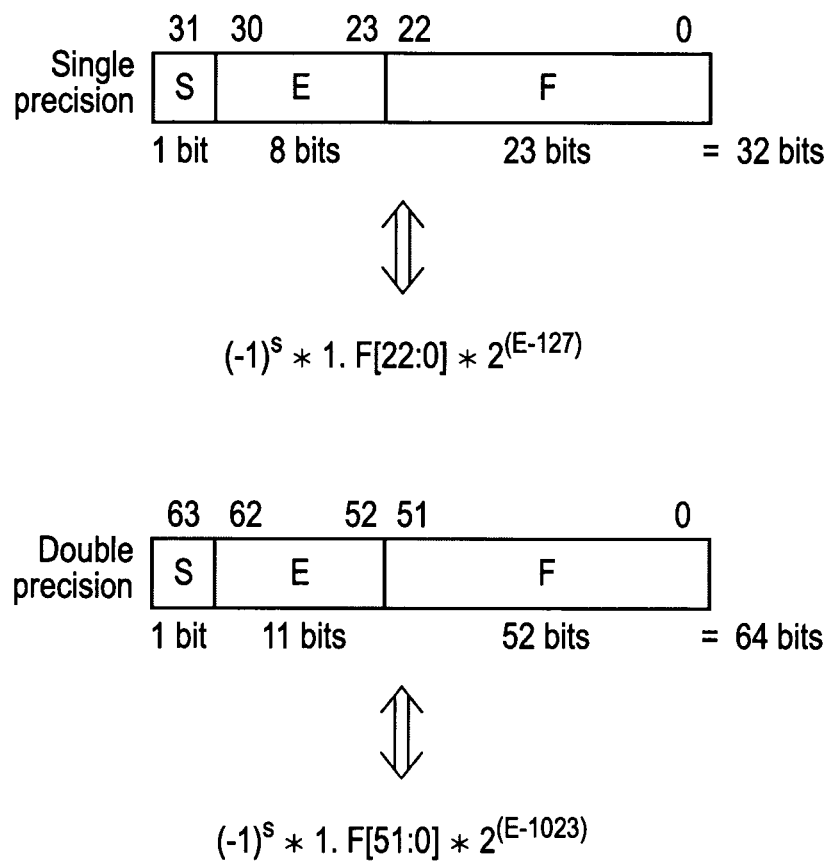
FIG. 1 shows representations of floating point numbers using the single precision and double precision floating point formats.
Figure 2:
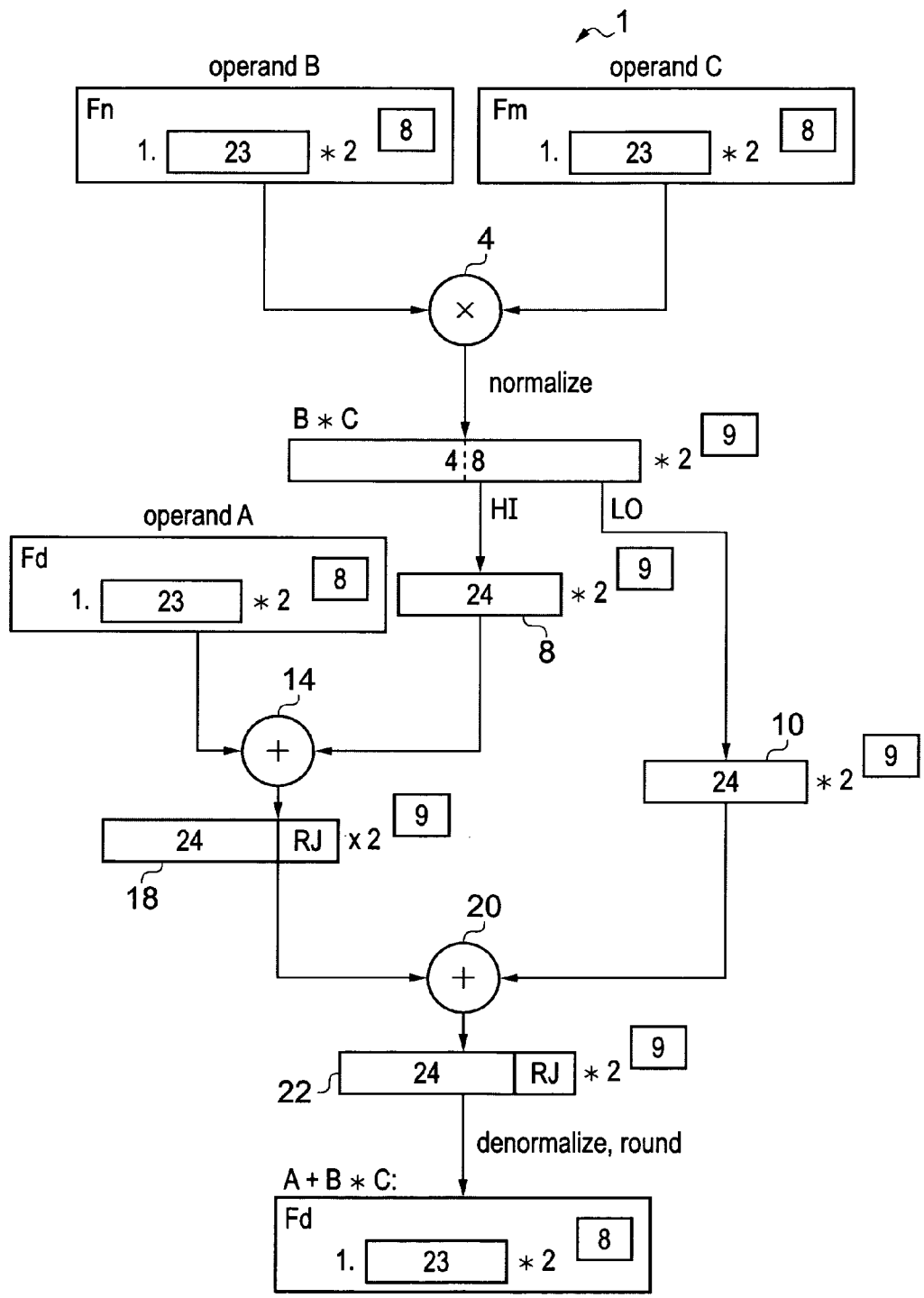
FIG. 2 illustrates a floating point apparatus for performing a fused multiply add operation using a two-step addition.

FIG. 2 schematically illustrates an apparatus 1 for performing a fused multiply add operation. In the apparatus, operands A, B and C are provided to the apparatus 1. In the example where single precision floating point representation is used, each operand has a 23-bit fractional part F of the mantissa (usually in the form 1.F, although the mantissa could be in the denormal form 0.F) and an 8-bit exponent E. Note that, while in the Figures the exponent is often indicated in the form $2^{[x]}$ (where X is the number of bits used to store the exponent), the actual number of places by which the radix point of the floating point value is shifted relative to the mantissa is the X-bit exponent value biased by 127 as shown in FIG. 1. Also, while not illustrated in FIGS. 2-9, each floating point value would also have a sign bit S indicating whether the value is positive or negative.

Operands B and C are multiplied together by a multiplier 4. The multiplier 4 generates a normalized product of operands B and C having a 48-bit mantissa and a 9-bit exponent. The multiplier may include a leading zero counter and left shifter (not illustrated in FIG. 2) for normalizing the product. The product B*C is divided into a high order portion 8 having a 24-bit mantissa and a 9-bit exponent, and a low order portion 10 having a 24-bit mantissa and a 9-bit exponent. The exponent of the product B*C is equal to the sum of the exponents of the operands B and C plus one, corrected if a normalization shift has occurred. The exponent of the high order portion 8 is equal to the exponent of the product B*C, while the exponent of the low order portion 10 is equal to the exponent of the product B*C minus 24.

One of the portions of the product B*C (for example, the high order portion 8) is added to the addend operand A using a first adder 14. The first adder 14 produces an intermediate value 18 having a 24-bit mantissa and a 9-bit exponent. The intermediate value 18 also has a rounding bit R and a jamming bit J. The rounding bit R is a bit used during rounding of the result of the fused multiply add operation. Various rounding techniques may be used in conjunction with the present technique. The jamming bit J is a bit that indicates whether one or more low order bits of a mantissa produced by adding the operand A and the high order portion 8 have non-zero values. The use of the jamming bit (which may also be referred to as a "sticky bit") will be described in more detail with reference to FIG. 8. The intermediate value may also include a guard bit (not illustrated) which guards against precision being lost if a left shift is required for normalization of the multiply add result.

The intermediate value 18 is then added to the other portion (in this example, the low order portion 10) of the product B*C by a second adder 20 in order to generate a result 22 having a 24-bit mantissa and a 9-bit exponent. The result 22 also includes a rounding bit R and a jamming bit J. The result 22 is then selectively denormalized and rounded to produce a rounded result A+B*C of the form $1.F*2^E$ or $0.F*2^{-126}$.

In FIG. 2, in order to conveniently illustrate the separate adding steps performed by the apparatus 1, the first adder 14 and the second adder 20 have been illustrated as separate components of the apparatus 1. However, the first and second addition steps can be performed using a common adding circuitry which is used in two passes to carry out the two addition steps.

Also, the example shown in FIG. 2 is illustrated with the high order portion 8 of the product B*C being added to the addend operand A in a first step, and the intermediate value obtained by adding the operand A and the high order portion 8 being added to the low order portion 10 in a second adding step. It will be appreciated that the low order portion could be added to the addend in the first adding step and the high order portion added in the second adding step.

By performing the addition of the product B*C and the addend of the operand A in two steps as shown in FIG. 2, adding circuitry 14, 20 for dealing with 24-bit mantissae can be used to handle a 48-bit mantissa of the product B*C. This means that the area overhead associated with the apparatus 1 is lower than would be the case if the product B*C was added to the operand A in a single step.

Figure 3:
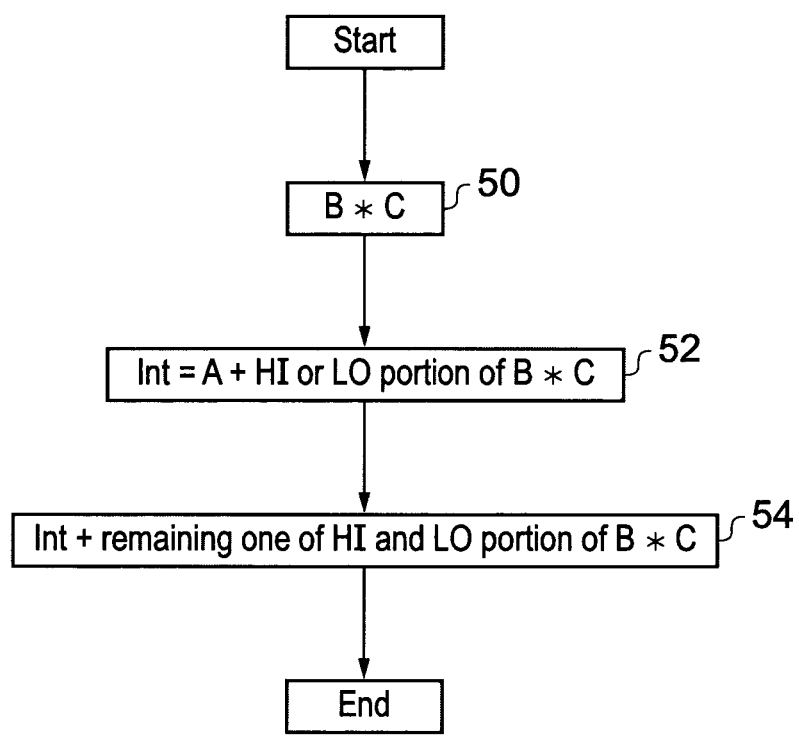
FIG. 3 shows a process for performing a fused multiply add operation in which the addition is broken down into two steps.

FIG. 3 shows a method of performing a fused multiply add operation according to the present technique. First, in step 50 the operands B and C, each having an N-bit mantissa, are multiplied together to produce a product B*C having a 2N-bit mantissa. Next, at step 52 the addend operand A is added to one of the high order portion of the product and the low order portion of the product to generate an intermediate value having an N-bit mantissa. At step 54, the intermediate value is added to a remaining one of the high order portion and the low order portion of the product B*C to generate a result value A+B*C which, after rounding, has an N-bit mantissa.

In the apparatus shown in FIG. 2, the high order portion 8 of the product B*C is added to the operand A in a first adding step and an intermediate result produced by the first adding step is added to the low order portion 10 in a second adding step. However, there are some sets of operands A, B and C for which performing the addition in this order is not appropriate. For these values, it is better to add the low order portion to the addend at the first adding step and to add the high order portion to the intermediate value at the second adding step. It is possible to arrange the apparatus 1 of FIG. 2 so that the low order portion 10 is added to the addend in the first adding step. However, there are other combinations of operand values A, B and C for which it is better to add the high order portion 8 to the operand A in the first adding step.

Figure 4:
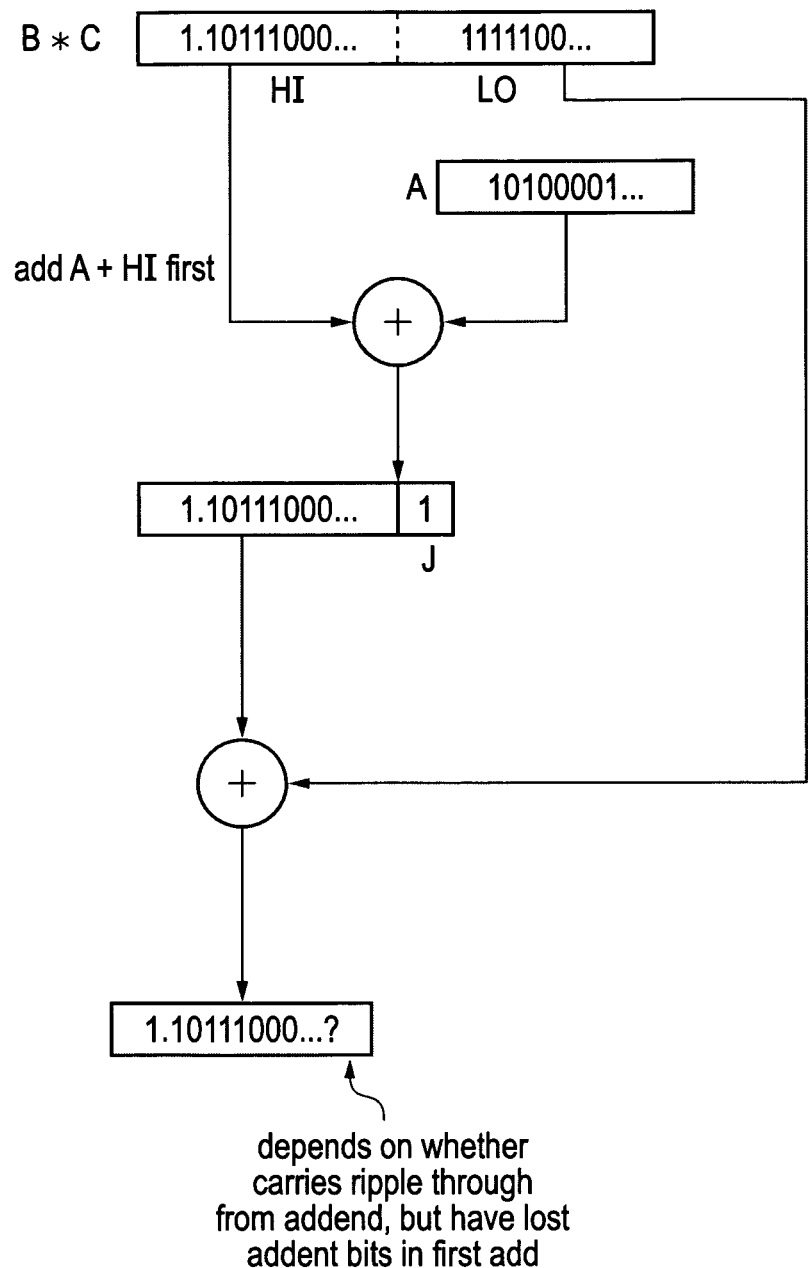
FIG. 4 shows a problem that can arise if the higher order portion of the product is added to the addend at the first addition step and the addend and product are of different orders of magnitude.

FIG. 4 illustrates an example of a case in which adding the high order portion first can cause problems. In this example, the product B*C is of a greater order of magnitude than the addend A, such that at least some (in this example, all) of the bits of the addend A are less significant than all of the bits of the high order portion of the product B*C. If the high order portion of the product is added to the addend first, then some of the bits of the addend will be reduced to a jamming bit simply indicating that at least one of these bits is non-zero. When the low order portion of the product is then added to the intermediate value, it is possible that carries from the addition of the low order portion and the addend could ripple through to the least significant bits of the high order portion. However, since the bits of the addend A have been reduced to a jamming bit at the first adding step, it is not possible to know whether such a carry would occur and so one or more of the lowest order bits of the result value may have an incorrect value. In cases where the product B*C and the addend A have exponents that are far apart, as illustrated in FIG. 4 (this case is known as the "far" case), it is therefore better to add the low order portion of the product to the addend at the first adding step, and to add the high order portion at the second adding step.

Figure 5:
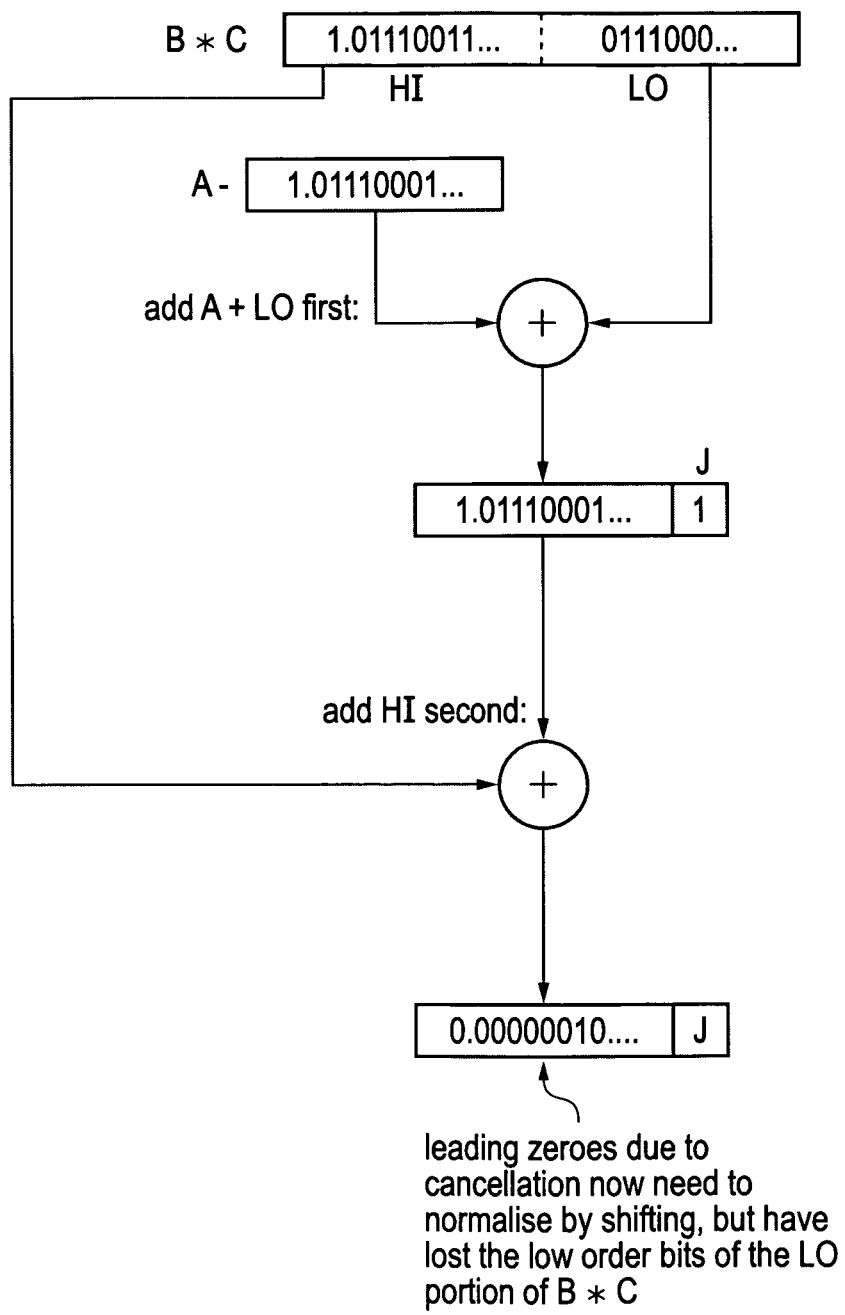
FIG. 5 shows a problem that may arise if the addend and product have similar orders of magnitude and the low order portion of the product is added to the addend at the first addition step.

FIG. 5 illustrates an example of a case in which adding the low order portion of the products at the first adding step can cause problems. In this example, the product B*C and the addend A have exponents having the same value. If the product B*C and the addend A have opposite signs (in this example, the product is positive while the addend is negative) then addition of these quantities can result in cancellation of several high order bits so that the result will comprise several leading zeros. In floating point units, if a result has leading zeros then its mantissa will be left shifted in order to ensure that it is in the normal floating point format $1.Fx2^E$. This could mean that values of the bits of the low order portion of the product B*C will be shifted into bit positions corresponding to the high order portion B*C and so will contribute to the eventual result of the fused multiply add operation. If the low order portion is added to the addend in the first adding step, these low order bits will be reduced to a jamming bit and so will not be available at the second adding step. This means that when the result value is shifted in order to place it in a normal floating point format, several low order bits are not available and so precision is lost. Therefore, for the case where leading zeros in the addition result are possible (this may occur when the exponents of the product and the addend differ by zero or one—this case is known as the "close case"), it is better to add the high order portion to the addend in the first adding step, and to add the low order portion at the second adding step. In this way, it is ensured that the bit values of the low order portion are available when calculating the final result.

As shown above, for some values of the operands A, B, and C it is better to add the high order portion to the addend in the first adding step, while for other combinations of values, it is better to add the lower order portion first. It is not straightforward to determine quickly and accurately which order is preferred for a particular set of operand values. Therefore, the present technique provides an apparatus that determines both a first intermediate value obtained by adding the high order portion to the addend, and a second intermediate value obtained by adding the lower order portion to the addend. These additions can be performed in parallel to one another, and meanwhile the apparatus can determine which order is preferred. The appropriate one of the intermediate values can then be selected in dependence upon the preferred order, and the remaining portion of the products added to the intermediate value in order to produce the final result.

Figure 6:
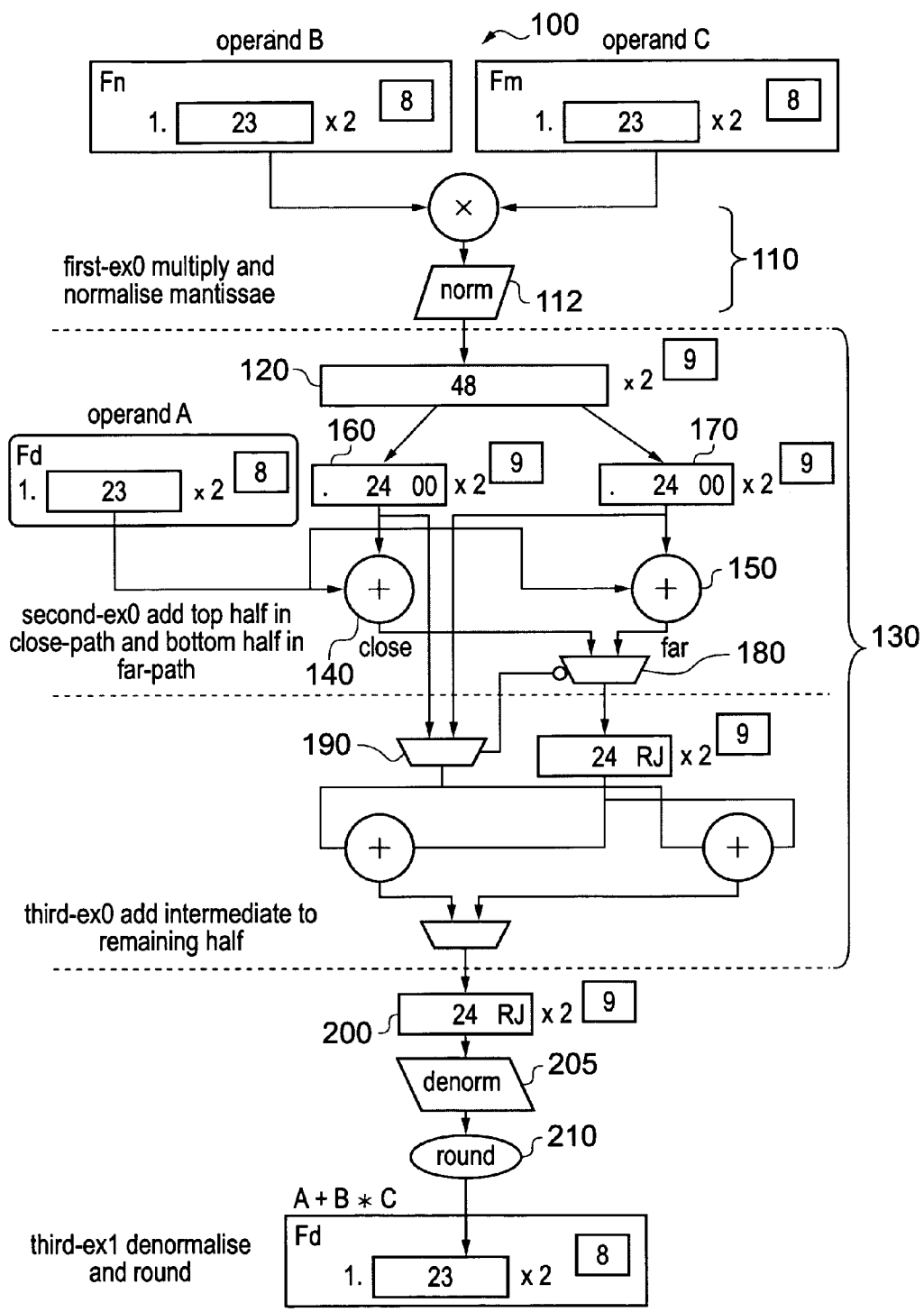
FIG. 6 shows a floating point unit having a split path adder for adding both portions of the product to the addend.

FIG. 6 shows an apparatus 100 arranged to perform the fused multiply add operation in this way. The apparatus 100 performs the fused multiply add operation in several steps. In a first step, the operands B and C are multiplied together by multiplying circuitry 110, and the resulting product B*C is normalized by normalizing circuitry 112 (comprising a count-leading-zeros circuit and a shifter). The normalized product 120 has a 48-bit mantissa and a 9-bit exponent.

The normalized product 120 is then added to the operand A using adding circuitry 130. The adding circuitry 130 comprises a split path adder having a first processing path 140 and a second processing path 150. The first processing path 140 adds a high order portion 160 of the product 120 to the operand A, while the second processing path 150 adds a low order portion 170 of the product 120 to the operand A. The first processing path produces a first intermediate value (corresponding to the sum of the high order portion 160 and the operand A), and the second processing path 150 produces a second intermediate value (corresponding to the sum of the low order portion 170 and the operand A). Both the first intermediate value and the second intermediate value are passed to a multiplexer 180. Meanwhile, the high order portion 160 and the low order portion 170 are passed to a multiplexer 190. The multiplexers 180, 190 are controlled in dependence on a comparison between the exponents of the product 120 and the operand A performed by comparing circuitry (not illustrated for clarity). Note that the comparing circuitry could also be arranged to compare the exponents of the operand A and the high order portion 160, since the values of the exponent of the product 120 and the exponent of the high order portion 160 are equivalent.

If it is determined that the exponents of the operand A and the exponent of a product 120 have an absolute difference of zero or one, then the situation illustrated in FIG. 5 could occur and so it is better to add the high order portion to the addend in the first addition step, followed by the low order portion in the second addition step. In this case, the multiplexer 180 selects the first intermediate value provided by the first processing path 140, and the multiplexer 190 selects the low order portion 170. The first intermediate value and the low order portion 170 are then added together as shown in FIG. 6 to produce a result value 200.

On the other hand, if it is determined that the absolute difference between the exponent value of the operand A and the exponent value of the product 120 is greater than one, then the multiplexer 180 selects the second intermediate value produced by the second processing path 150 of the adding circuit 130, and the multiplexer 190 selects the high order portion 160. The high order portion 160 and the second intermediate value are then added together by the adding circuitry 130 and the result 200 is generated.

Regardless of which values are selected by the multiplexers 180, 190, the result value 200 may selectively be denormalised using denormalizing circuitry 205 (i.e. shifted right in order to place it in a denormal form $0.Fx2^E$) and rounded using rounding circuitry 210 in order to produce a rounded result value A+B*C.

Although the adding circuitry 130 is illustrated in FIG. 6 with separate adders for performing the first and second adding steps, the two adding steps can be implemented using common adding circuitry that is used in multiple passes to perform each adding step. This arrangement will be explained more with reference to FIG. 9.

FIG. 6 has been explained above with the multiplexers 180, 190 making their respective selections in dependence upon whether the absolute difference between the exponents of the operand A and the product 120 is greater than one. However, a more precise determination of whether or not cancellation of high order bits will occur (as shown in FIG. 5) could be made and the multiplexers 180, 190 could also be controlled in dependence upon such a determination.

Figure 7:
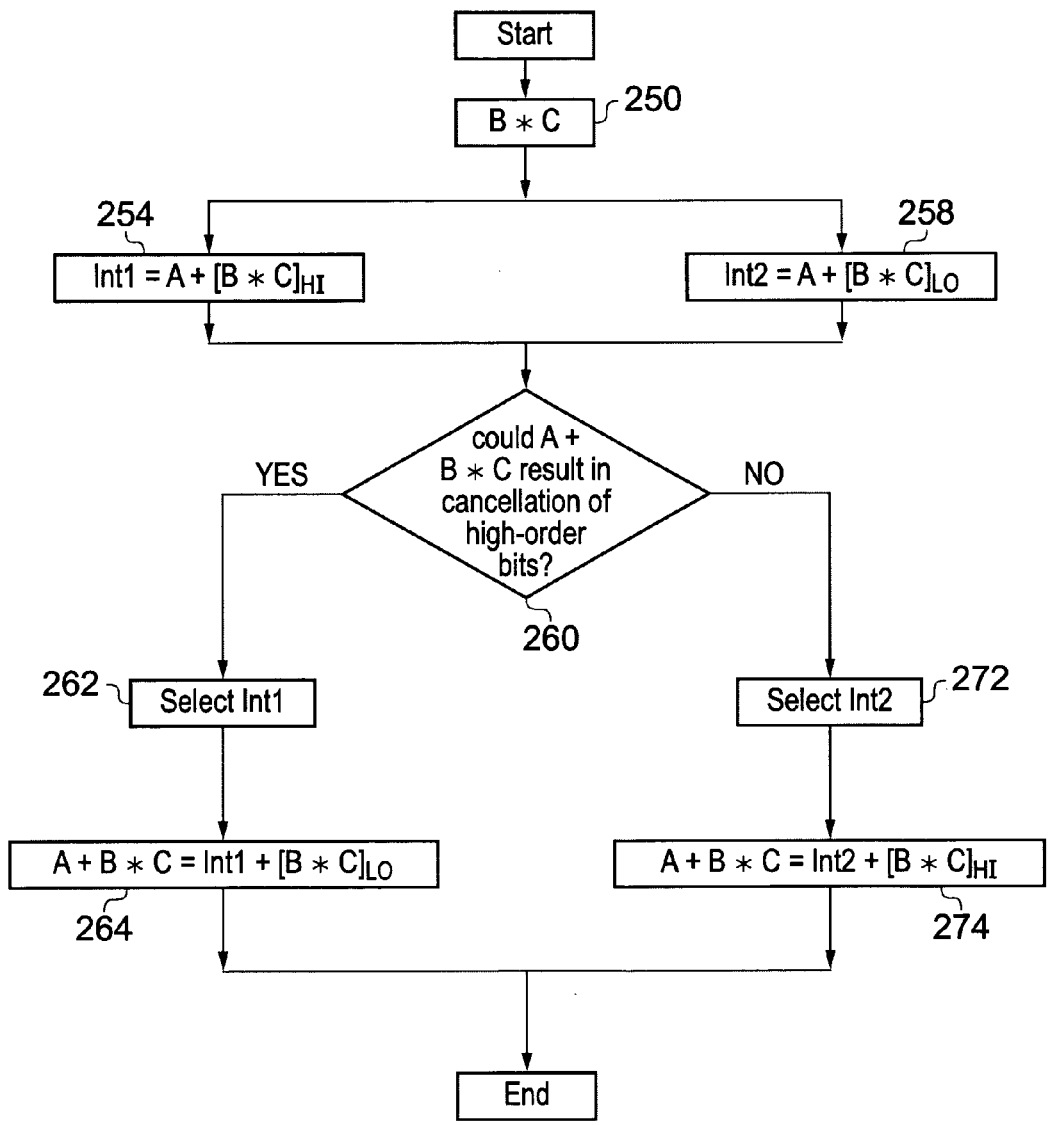
FIG. 7 illustrates a process for performing a fused multiply add operation in which both portions of the product are added to the addend.

FIG. 7 shows a process for performing a fused multiply add operation using an apparatus such as the apparatus 100 illustrated in FIG. 6. At step 250, the operands B and C are multiplied together by the multiplier 110 and normalized in order to generate a normalized product B*C. The process then proceeds to steps 254 and 258 which are performed in parallel with one another. At step 254, a first intermediate value Int1 is generated by adding the operand A to a high order portion of the product B*C. Meanwhile, at step 258 a second intermediate value Int2 is generated by adding the addend operand A to a low order portion of the product B*C.

At step 260, the apparatus determines whether the fused multiply add operation could result in cancellation of one or more high order bits of the addend and the product B*C. This determination could be done in a variety of ways, one of which being the comparison of exponents of the addend A and the product B*C in order to determine whether or not an absolute difference between these exponents is greater than a predetermined threshold level (the threshold level being one, for example). If at step 260 it is determined that cancellation of high order bits could result from the fused multiply add operation, then at step 262 the first intermediate value Int1 is selected and at step 264 the first intermediate value Int1 is added to the low order portion of the product B*C to generate the result A+B*C. The result A+B*C may then be denormalized and/or rounded as appropriate. On the other hand, if at step 260 it is determined that cancellation of high order bits could not result from the fused multiply add operation then at step 272 the second intermediate value Int2 is selected and the second intermediate value Int2 is added to the high order portion of the product at step 274 in order to generate the result A+B*C, which again is denormalized and/or rounded as appropriate. The process then ends. Although for convenience step 260 has been illustrated in FIG. 7 as occurring after the calculation of the first and second intermediate values in steps 254 and 258, it will be appreciated that at least part of the determination of whether cancellation of high order bits is possible can be performed in parallel with steps 254 and 258.

Figure 8A:
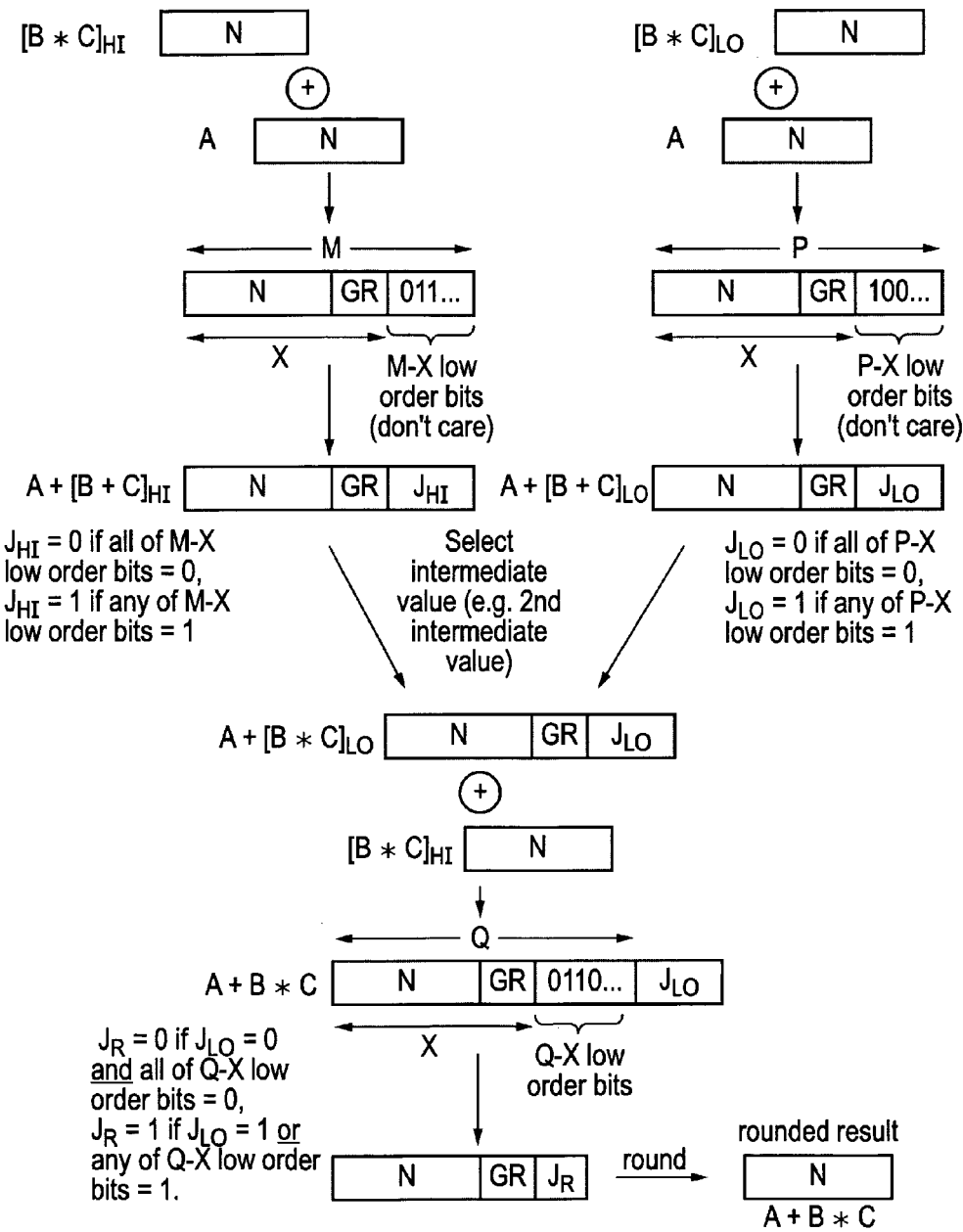
FIG. 8A illustrates the use of a jamming bit to represent low order bits of a floating point value.

FIG. 8A illustrates how the jamming bits (or "sticky bits") may be used in the present technique. As shown in FIG. 6, the apparatus 100 includes rounding circuitry 210 for rounding the result value to produce a floating point value of the appropriate format. The rounded result may have a mantissa having N bits. However, the first and second intermediate values obtained by adding the operand A to the high and low order portions of the product and the unrounded result A+B*C each have mantissae with more than N bits. When an intermediate value is generated with more than X bits for the mantissa ($X \geq N$), bits other than the X highest order bits will not be included in the rounded result and so the values for these bits are not particularly important. The only way in which these bits can contribute to the final rounded value is if these bits have a non-zero value, which can indicate that the result cannot be exactly represented by the floating point representation being used and must therefore be rounded up or down to the nearest representable value. Therefore, these low order bits are reduced to a jamming bit J indicating whether or not any one of these low order bits has a value of one. If any of the low order bits has a value of one then the jamming bit has a value of one, while if all of the low order bits are zero then the jamming bit has a value of zero. The use of the jamming bit helps to reduce the width of the various adders and shifters required for the floating point unit, thus reducing the circuit overhead required.

As $X \geq N$, X (the size of the mantissae of the first and second intermediate values and unrounded result) can be either greater than N or equal to N (where N is the size of the mantissa of the rounded result). X is greater than N when a guard bit G or a rounding bit R is generated as part of the mantissa. The guard bit G is a bit that may get shifted into the final result if the result is normalized, while the rounding bit R is a bit that helps the rounding circuitry to select whether to round up or down. For the example shown in FIG. 8A, X=N+2 since both the guard bit and the rounding bit are used. However, one or both of the guard bit and rounding bit could be omitted, in which case X=N.

As shown in the example of FIG. 8A, the addition of the high order portion [B*$C_{HI}$] and the addend A results in a first intermediate value having an M-bit mantissa ($M \geq X$). M-X low order bits of the first intermediate value are reduced to a jamming bit which takes a value of zero if all of the M-X low order bits are zero and a value of one if any of the low order bits are one. Similarly, the addition of the low order portion [B*$C_{LO}$] and the addend A produces a second intermediate value having a P-bit mantissa ($P \geq X$). The P-X lowest order bits of the second intermediate value are represented using a jamming bit $J_{LO}$. $J_{LO}=0$ if all of the P-X low order bits of the second intermediate value are zero, and $J_{LO}=1$ if any of the P-X low order bits are non-zero.

Then, one of the first intermediate value and second intermediate value is selected (for example, the second intermediate value). The selected intermediate value is added to the remaining one of the high order portion and low order portion (in this example, the high order portion) to produce an unrounded result A+B*C which has a Q-bit mantissa. At this stage, it is possible to arrange the adding circuitry to produce a second jamming bit in addition to the jamming bit that is produced along with the selected intermediate value. However, the number of jamming bits (and hence the width of some buses and circuits within the floating point apparatus) can be reduced by combining the jamming bit of the selected intermediate value and a new jamming bit produced from the result value into a single, combined, jamming bit $J_R$. The result jamming bit $J_R$ has a value of one if either the jamming bit of the selected intermediate value (in this case, $J_{LO}$) or any of the Q-X lowest order bits of the Q-bit mantissa of the unrounded result have a value of one. If all of the Q-X lowest order bits have a value of zero, and the jamming bit of the selected intermediate value is zero, then $J_R=0$. The unrounded result is then rounded by the rounding circuitry 210, in which the result jamming bit $J_R$, along with a "rounding bit" (not shown), is used to determine whether the result should be rounded up or down. The rounding circuitry produces a rounded result having an N-bit mantissa.

Note that in FIG. 8A, the mantissae of sizes M, P and Q may not actually be generated by the floating point unit. It is possible that the apparatus obtains the jamming bits $J_{HI}$, $J_{LO}$, $J_R$ directly from the values of the product B*C and the addend A, so that the adding circuitry proceeds straight from the values of the product and addend to the intermediate result having the jamming bit, without calculating the step in between as shown in FIG. 8A. In practice, the low order bits that contribute to the jamming bit will only derive from one of the operands A and B*C (whichever has the smaller exponent), and so the jamming bit can be accumulated as the operand with the smaller exponent is aligned, rather than waiting for the addition itself to be performed.

FIG. 8A shows an example of the use of jamming bits in the case where M, the size of the mantissa representing the sum of the high order portion and the operand A, and P, the size of the mantissa representing the sum of the low order portion and the operand A, are both greater than X, the size of the mantissae of the intermediate results once low order bits have been reduced to a jamming bit. However, it is possible that M or P could be equal to X. This can occur for several reasons. One possibility is that the significances of the addend A and either of the portions of the product B*C are such that they are already closely aligned, so that the sum of the two does not have any low order bits beyond a guard bit or rounding bit. Also, as shall be explained below with respect to FIG. 9, it is possible that the path for calculating the first intermediate value has only a limited alignment shifting capacity, so regardless of the relative significance of the two values being added, the values will be treated as if they are aligned to within one place and so this processing path will not produce any M-X low order bits to be reduced to a jamming bit.

Figure 8B:
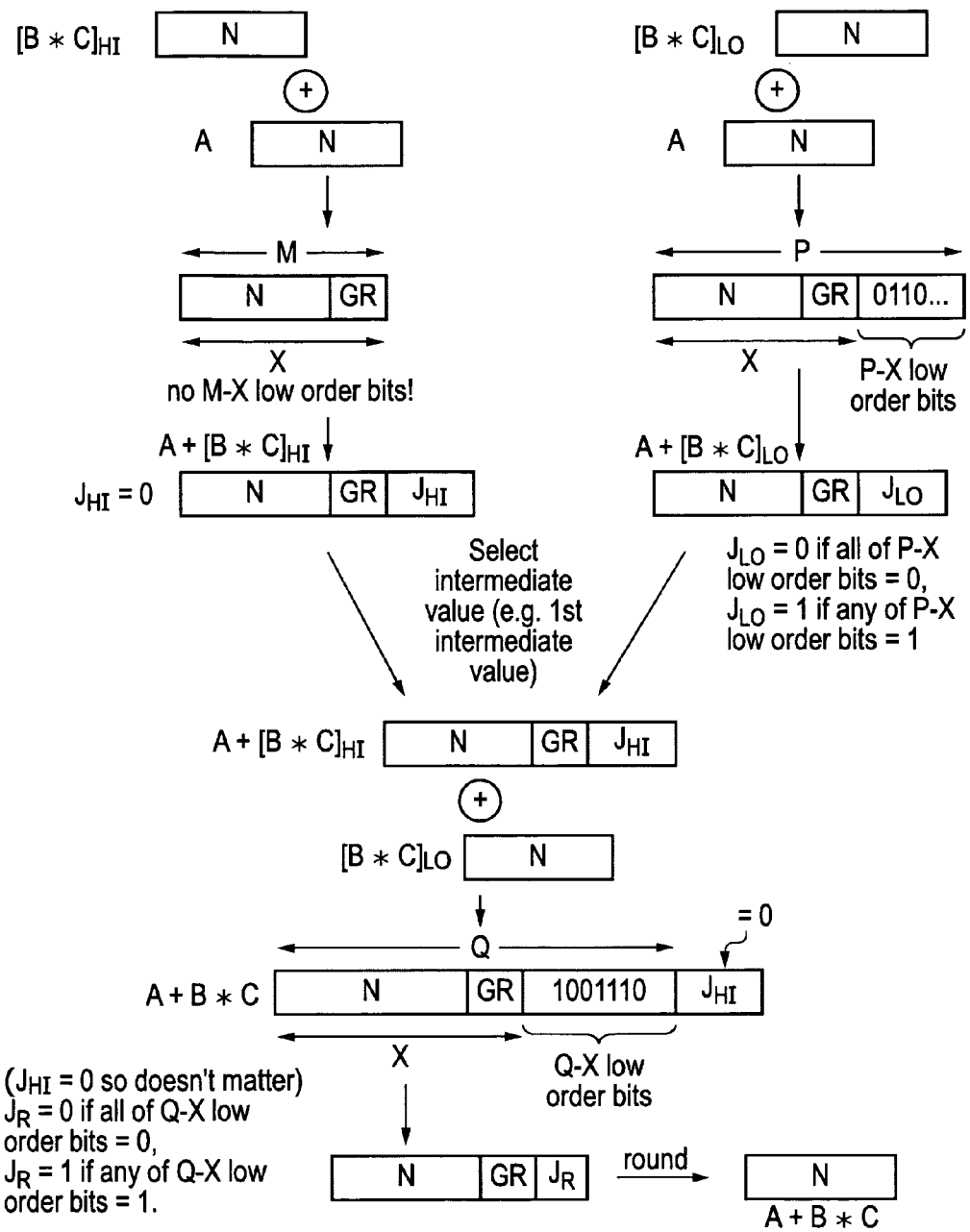
FIG. 8B illustrates another example of the use of the jamming bit.

FIG. 8B shows an example of such a case. In this case, the values of the high order portion and addend are such that they are aligned to within one place. Thus, when added the resulting mantissa would have M bits, where M=X. Other than the N bits which correspond to the size of the eventual rounded result, the only other bits in this example are the guard and/or rounding bits. This means that there are no M−X low order bits to reduce to a jamming bit. In this case, the jamming bit $J_{HI}$ is set to zero, since there are no non-zero values for M−X low order bits. The result jamming bit $J_R$ is then calculated as for FIG. 8A, but since in this example the first intermediate value is selected rather than the second intermediate value, the jamming bit $J_{HI}$, having a value of zero in this example, is used in the final step rather than $J_{LO}$ as in FIG. 8A.

Figure 9:
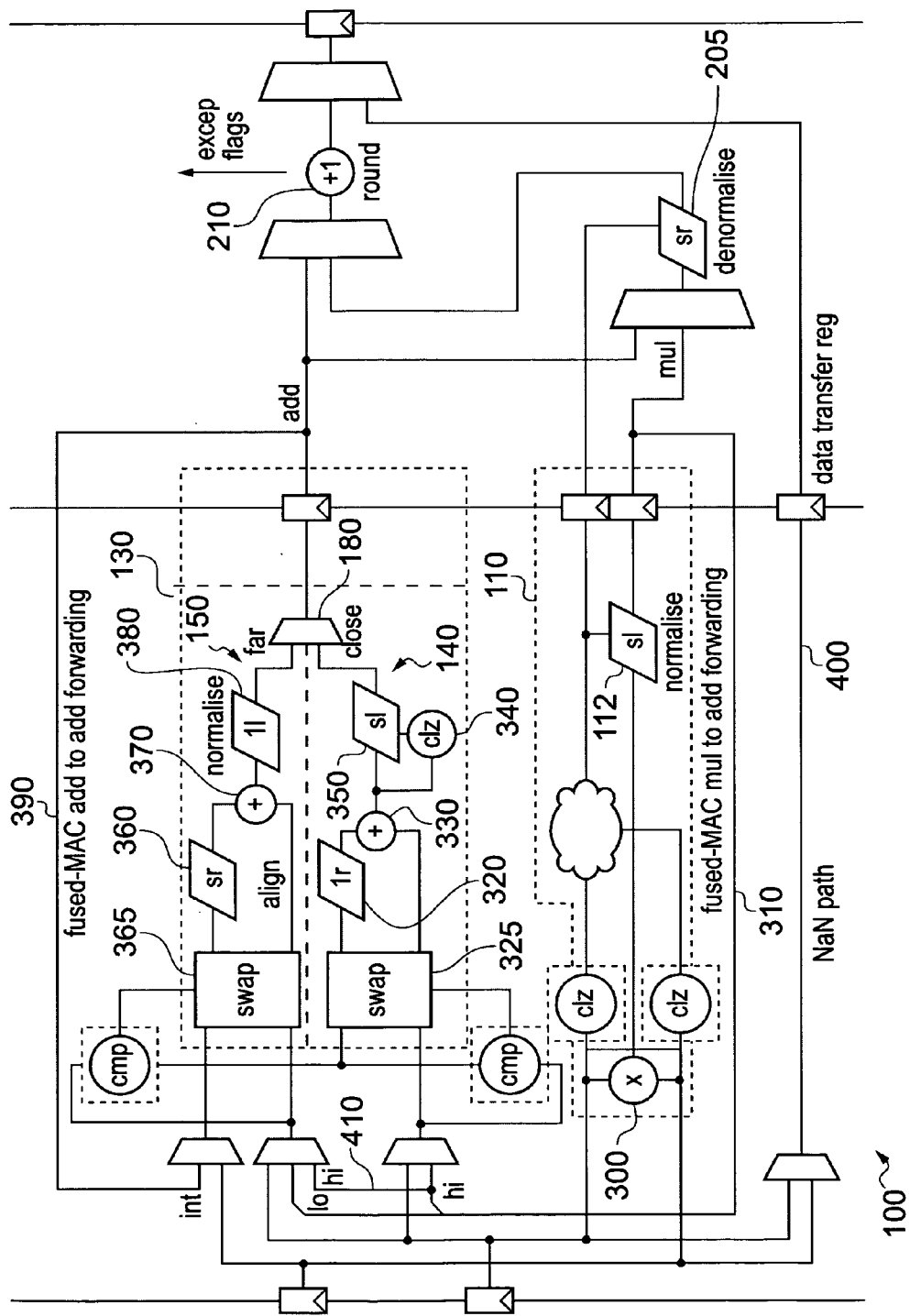
FIG. 9 illustrates a floating point unit for performing a fused multiply add operation.

FIG. 9 shows in more detail an example arrangement of the apparatus 100 of FIG. 6 is arranged. The multiplying circuitry 110 and the adding circuitry 130 are arranged in parallel with one another within the data path running through the apparatus 100. Various buses and multiplexers are provided so that the adding circuitry 130 and multiplying circuitry 110 can be used independently from one another as well as in tandem. In this way, the apparatus 100 can be used to execute stand alone add operations and multiply operations as well as multiply add operations.

The multiplying circuitry 110 includes a multiplier 300 for multiplying operands B and C to generate a product B*C and normalizing circuitry 112 comprising a leading zero counting logic for determining the number of leading zeros and a left shifter for performing a left shift by a number of places equal to the determined number of leading zeros. When the apparatus 100 is executing a multiply instruction then the product result produced by the multiplying circuitry 110 will be output. When the apparatus 100 is carrying out a fused multiply add operation, then the result of the multiplying circuitry 110 is forwarded to the adding circuitry over a bus 310. The product is broken down into a high order portion and a low order portion and the high and low order portions of the product are passed to respective paths 140, 150 of the split path adder 130.

The processing paths 140, 150 are adapted for performing additions in the "close case" and the "far case" respectively. In the close case, the operand A and the product B*C have exponents which are the same or which differ by one. Therefore, the close path 140 uses a shifter 320 which shifts either the operand A or the high order portion of the product B*C by up to one place to the right (the operand A and high order portion can be swapped using swapping circuitry 325 so that the appropriate value is sent to the shifter 320). The addend A is then added to the high order portion of the product by an adder 330. Leading zero count circuitry 340 determines the number of leading zeros in the result produced by the adder 330 and controls a left shifter 350 to shift the mantissa of the result produced by the adder 330 left by an appropriate number of places so as to remove the leading zeros. The left shifted result is then provided to the multiplexer 180.

On the other hand, the far path 150 is adapted for processing values of the operand A and the low order portion of the product B*C in the case where they have exponents that differ by greater than one. In this case, an alignment shift of greater than one place is required and so a right shifter 360 is provided for shifting one of the quantities being added by the requisite number of places (again, swapping circuitry 365 is provided to switch the paths on which the operand A and the low order portion are transmitted such that the appropriate quantity is shifted right by the shifter 360). The low order portion is then added to the addend A by an adder 370 and the sum of these values is left shifted by up to one place by a left shifter 380. Since in the far case the result of the adder 370 will not have more than one leading zero, at most only a normalization shift of one place will be required (unlike in the close case). The result is then provided to the multiplexer 180.

Since the alignment shifter 320 of the close path 140 has a more limited shifting capability than the alignment shifter 360 of the far path 150, the shifter 320 will have a reduced circuit overhead compared to the shifter 360. Similarly, the normalization shifter 380 in the far path 150 has a smaller circuit overhead than the normalization shifter 350 of the close path 140. By providing these reduced capability shifters where appropriate, the circuit overhead can be reduced and the worst-case processing time for a single pass through the adding circuitry can be reduced.

As described with reference to FIG. 6, the multiplexer 180 selects one of the intermediate values produced by the respective processing paths 140, 150 of the adding circuitry 130 in dependence upon whether the far case or the close case applies (this may be determined based on the exponents of the addend A and product B*C). The selected intermediate result is then forwarded back to the inputs of the adding circuitry 130 using a bus 390. In a second pass through the adding circuitry 130, the intermediate value can then be added to the remaining one of the low or high order portions of the product in order to produce the multiply add result A+B*C. If the close path 140 was used in the first pass through the adding circuitry 130, then the first intermediate value (representing the sum of the addend A and the high order portion of the product B*C) is added to the low order portion of the product B*C by the adding circuitry 130. If the far path value was selected on the first pass through the adding circuitry 130 (i.e. the second intermediate value produced by adding the addend A to the low order portion of the product B*C) then on the second pass through the adding circuitry 130 the high order portion of the product B*C is added to the second intermediate value. The result A+B*C of the second pass through the adding circuitry 130 is then output, denormalized by denormalizing circuitry 205 and/or rounded by rounding circuitry 210 as appropriate, and output as a rounded result A+B*C.

Although generally the selection of one of the first and second intermediate values can be made in dependence on the absolute difference between exponents of the addend A and product B*C, this can be overridden if the addend A has a value of zero. If the addend A is zero then the first intermediate value can be selected. The close path is better at handling zero addends, since in this case an alignment shift will not be necessary while a normalization shift of more than one place may be required.

As well as the multiplying circuitry 110 and adding circuitry 390, the floating point apparatus 100 may comprise one or more paths for handling exceptions. For example, the apparatus could comprise a path 400 for handling NaN (not a number) values.

The floating point unit 100 may optionally comprise a bus 410 for providing the high order portion to the far path 150 of the adding circuitry 130. As described above, for most cases the high order portion is provided to the close path 140, to be added to the operand A in the first pass through the adding circuitry 130. However, it is possible that the product B*C generated by the multiplying circuitry 110 is a subnormal number. A subnormal floating point number has a value that is smaller than the smallest value that is representable using the normal floating point format $1.F*2^E$ (for example, in the single precision format a subnormal number has a significance that is less than $2^{-126}$). At the same time, the operand A may be a denormalised number, that is, it has at least one leading zero. The product will need to be aligned with the operand A in order to perform the addition. Since this alignment may require a shift of more than one place, the close path 130 (having the limited alignment shifter 320) is unable to deal with the subnormal value and so instead the far path 150

(having an alignment shifter 360 that can shift by more than one place) is required. It is possible that once the subnormal product B*C and the operand A have been aligned, addition of the product and operand A will result in cancellation of one or more most significant bits, as in the case shown in FIG. 5. To avoid the problem shown in FIG. 5, it is desirable to add the high order portion to the addend operand A at the first adding stage, and to add the low order portion at the second adding stage. To enable the far path 150 to add the high order portion at the first adding stage, the bus 410 is provided to transfer the high order portion of the product B*C to the far path 150 of the adding circuitry 130. The bus 410 is used when the product B*C is subnormal.

As mentioned above, to improve the clarity of FIG. 9, the circuitry for dealing with the sign bit S of the various floating point values being processed is not illustrated. The way in which signs are handled by the adding circuitry 130 will now be described.

Adding circuitry 130 is used to perform both addition and subtraction, depending on whether the signs of the two quantities being added are the same (addition) or different (subtraction). Some adding circuits would ensure that when performing a subtraction, the quantities are processed in the order "large-small" (i.e. the smaller quantity is subtracted from the larger quantity to generate a positive result). If the values are fed into the adding circuitry in the wrong order then they can be swapped round to ensure that they are processed in the "large-small" order. However, determining the correct order for the subtraction requires a full comparison of the two floating point values (i.e. comparing the two mantissae, the two exponents, and the two sign bits). Alignment of the two values may be necessary in order to perform this comparison, and so a proper comparison of the floating point values can take a significant amount of time.

In contrast, the adding circuitry 130 of the present technique only compares the exponents of two values being subtracted, processing the values in the order "large exponent-small exponent". The quantities being subtracted may be swapped by swapping circuitry 325, 365 if necessary, so that the value with the smaller exponent is passed through the right shifter for alignment and then subtracted from the value with the larger exponent. The sign bit of the result is set to be equal to the sign bit of the number that is estimated to be the larger number based on the comparison of exponents (as we shall see below, this number may not actually be the larger number). Since a complicated comparison (including alignment of mantissae) is not performed, the processing time is significantly reduced.

However, it is possible that the comparison of exponents incorrectly estimates which quantity is larger. When the exponents of the two quantities are the same, there is a possibility that the numbers are subtracted in the order "small-large" in order to generate a result having a mantissa with a negative value. The sign bit will also have been set to the wrong value (equal to the sign bit of the number that was incorrectly assumed to be larger). This can be addressed in one of two ways, depending on the type of operation that the adding circuitry 130 is currently performing.

If the adding circuitry 130 is performing an independent add operation, or if the adding circuitry is performing the second adding step of a fused multiply add operation, then the negative number can be negated by performing two's complement negation (inverting all the bits and adding one). The present technique avoids the need for specialised circuitry for performing the addition part of the negation in the adding circuitry 130 by instead performing the addition of one using the rounding circuitry 210. It is recognised that adding one for negation will never be needed at the same time as rounding (since adding one for negation will only affect the final result when the result is exact, in which case the rounding logic will not need to round the result up). By reusing the already provided rounding circuitry 210 to also perform the negation in the event of the subtraction resulting in a negative number, the circuit area used by the floating point unit is reduced. When negation is necessary in order to prevent the subtraction result being negative, then the sign bit of the initially produced result is changed, so as to be equal to the sign bit of the larger floating point value (i.e. the value that was incorrectly estimated as being the smaller of the two values following the comparison of exponents).

On the other hand, when the adding circuitry 130 is performing a subtraction for the first adding step of a fused multiply add operation, then in the case where the quantities are subtracted in the wrong order the negative result from the adder will be an intermediate result. In this case, the intermediate result will not pass through the rounding circuitry 210 as it will instead be forwarded over bus 390 for use as an input for the second pass through the adding circuitry 130. Rather than trying to negate the negative intermediate result (which would increase processing time), the intermediate value is fed back into the adding circuitry 130 as it is, and instead the second adding step will operate appropriately as a result of the associated sign bit also being the opposite of what would be required if the intermediate were positive.

For example, if the intermediate result is a positive number with a negative sign (i.e. subtraction has occurred in the correct order), then like-signed-addition is performed by the adding circuitry 130 in order to produce a positive result, larger than both the operands, with a negative sign. If the intermediate result is a negative number (but with an initial sign which was positive) and the second part of the product is a positive number (it always is) with a negative sign, then rather than negating the intermediate to produce a positive number with a negative sign (which would take more time) and perform like-signed-addition as above, the adding circuitry instead performs an unlike-signed-addition. Depending on the order in which this unlike-signed-addition is done (which could be either order, since only a comparison of exponents is performed, not a full comparison), the adding circuitry 130 may produce a positive or negative result. In either case the result will be larger than the two operands (so will effectively be a like-signed-addition). If the final result is a negative number (which will have a positive sign) it can be negated as per normal addition, using the rounding logic 210 as described above, to produce a positive number with a negative sign—which is correct. If the final result is a positive number with a negative sign it is already correct and so no negation is necessary. Either way, the final result is correct.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus for performing a fused multiply add operation on operands A, B and C to generate a result A+B*C, said operands A, B and C and said result A+B*C being floating point values, said data processing apparatus comprising:

multiplying circuitry configured to multiply said operands B and C to generate a product B*C having a high order portion and a low order portion; and adding circuitry configured to:

(i) add said operand A to one of said high order portion and said low order portion to generate an intermediate sum value; and (ii) add said intermediate sum value to a remaining one of said high order portion and said low order portion to generate said result A+B*C.

2. A data processing apparatus for performing a fused multiply add operation on operands A, B and C to generate a result A+B*C, said operands A, B and C and said result A+B*C being floating point values, said data processing apparatus comprising:

multiplying means for multiplying said operands B and C to generate a product B*C having a high order portion and a low order portion; and adding means for:

(i) adding said operand A to one of said high order portion and said low order portion to generate an intermediate sum value; and (ii) adding said intermediate sum value to a remaining one of said high order portion and said low order portion to generate said result A+B*C.

3. A method for performing a fused multiply add operation on operands A, B and C to generate a result A+B*C, said operands A, B and C and said result A+B*C being floating point values, said method comprising the steps of:

multiplying said operands B and C to generate a product B*C having a high order portion and a low order portion;

adding said operand A to one of said high order portion and said low order portion to generate an intermediate sum value; and adding said intermediate sum value to a remaining one of said high order portion and said low order portion to generate said result A+B*C.

4. A data processing apparatus for performing a fused multiply add operation on operands A, B and C to generate a result A+B*C, said operands A, B and C and said result A+B*C being floating point values, said data processing apparatus comprising:

multiplying circuitry configured to multiply said operands B and C to generate a product B*C having a high order portion and a low order portion; and adding circuitry configured to:

(i) generate a first intermediate value by adding said operand A to said high order portion;

(ii) generate a second intermediate value by adding said operand A to said low order portion;

(iii) select one of said first intermediate value and said second intermediate value; and (iv) generate said result A+B*C by a selected one of a first addition and a second addition:

(a) said first addition comprising adding said first intermediate value to said low order portion and being selected by said adding circuitry if said first intermediate value is selected as said one of said first intermediate value and said second intermediate value; and (b) said second addition comprising adding said second intermediate value to said high order portion and being selected by said adding circuitry if said second intermediate value is selected as said one of said first intermediate value and said second intermediate value.

5. The data processing apparatus according to claim 4, wherein said adding circuitry is configured to generate said first intermediate value and said second intermediate value in a first pass through said adding circuitry and generate said result A+B*C in a second pass through said adding circuitry;

said data processing apparatus comprises forwarding circuitry for forwarding outputs generated in said first pass through said adding circuitry for use as inputs for said second pass through said adding circuitry; and said adding circuitry comprises at least some circuitry that is used for both said first pass and said second pass.

6. The data processing apparatus according to claim 4, wherein:

said data processing apparatus includes rounding circuitry for rounding said result A+B*C to generate a rounded result value having an N-bit mantissa;

said first intermediate value includes an X-bit mantissa representing X high order bits of an M-bit mantissa representing a sum of said high order portion and said operand A, and a jamming bit indicative of whether any of M−X low order bits of said M-bit mantissa have a non-zero value, where $M \geq X$ and $X \geq N$;

said second intermediate value includes an X-bit mantissa representing X high order bits of a P-bit mantissa representing a sum of said low order portion and said operand A, and a jamming bit indicative of whether any of P−X low order bits of said P-bit mantissa have a non-zero value, where $P \geq X$; and said result A+B*C includes an X-bit mantissa representing X high order bits of a Q-bit mantissa representing said selected one of said first addition and said second addition, and a jamming bit indicative of whether there is a non-zero value for any of: (i) Q−X low order bits of said Q-bit mantissa; and (ii) said jamming bit said selected one of said first intermediate value and said second intermediate value, where $Q>X$.

7. The data processing apparatus according to claim 4, wherein said adding circuitry is configured to select said one of said first intermediate value and said second intermediate value in dependence on an estimation of whether said operand A and said high order portion have values such that addition of said operand A and said high order portion would result in cancellation of a plurality of high order bits of said operand A and said high order portion.

8. The data processing apparatus according to claim 7, wherein said adding circuitry is configured to select as said one of said first intermediate value and said second intermediate value:

(i) said first intermediate value if it is estimated that said operand A and said high order portion have values such that addition of said operand A and said high order portion would result in cancellation of said plurality of high order bits of said operand A and said high order portion; and (ii) said second intermediate value if said operand A and said high order portion have values such that addition of said operand A and said high order portion would not result in cancellation of said plurality of high order bits of said operand A and said high order portion.

9. The data processing apparatus according to claim 4, wherein when said product B*C is a normalized floating point value having an exponent with an exponent value $E_{BC}$ and said operand A is a normalized floating point value having an exponent with an exponent value $E_A$, then said adding circuitry is configured to select said one of said first intermediate value and said second intermediate value in dependence on whether or not an absolute difference between said exponent value $E_{BC}$ and said exponent value $E_A$ is greater than an exponent difference threshold.

10. The data processing apparatus according to claim 9, wherein said adding circuitry is configured to select as said one of said first intermediate value and said second intermediate value:
  (i) said first intermediate value if said absolute difference between said exponent value $E_{BC}$ and said exponent value $E_A$ is not greater than said exponent difference threshold; and
  (ii) said second intermediate value if said absolute difference between said exponent value $E_{BC}$ and said exponent value $E_A$ is greater than said exponent difference threshold.

11. The data processing apparatus according to claim 9, wherein said exponent difference threshold is equal to one.

12. The data processing apparatus according to claim 4, wherein said adding circuitry comprises a first processing path configured to generate said first intermediate value and a second processing path configured to generate said second intermediate value, said first processing path being configured to operate in parallel with said second processing path.

13. The data processing apparatus according to claim 12, wherein:
  said first processing path comprises first alignment circuitry for aligning said high order portion and said operand A, a first adder for adding said high order portion and said operand A to generate said first intermediate value, and first normalizing circuitry for normalizing said first intermediate value;
  said second processing path comprises second alignment circuitry for aligning said low order portion and said operand A, a second adder for adding said low order portion and said operand A to generate said second intermediate value, and second normalizing circuitry for normalizing said second intermediate value;
  said first alignment circuitry has a more limited alignment capability than said second alignment circuitry; and
  said second normalizing circuitry has a more limited normalizing capability than said first normalizing circuitry.

14. The data processing apparatus according to claim 4, wherein:
  said operands A, B and C each have an N-bit mantissa;
  said product B*C has a 2N-bit mantissa; and
  said high order portion and said low order portion each have an N-bit mantissa.

15. The apparatus according to claim 14, wherein said operands A, B and C each have an X-bit exponent;
  said product B*C, said high order portion and said low order portion each have an (X+1)-bit exponent;
  said exponents of said product B*C and said high order portion each have a value E; and
  said exponent of said low order portion has a value equal to (E−N).

16. The apparatus according to claim 4, wherein if one of said product B*C and said operand A represents a negative number, then said adding circuitry is configured to:
  select, in dependence on an estimate of which of said product B*C and said operand A has a larger absolute value, a subtraction order from one of: product B*C minus operand A, and operand A minus product B*C;
  generate said first intermediate value and said second intermediate value in accordance with said selected subtraction order; and
  perform said selected one of said first addition and said second addition using said selected one of said first intermediate value and said second intermediate value, said selected one of said first intermediate value and said second intermediate value being unchanged between being generated and being used for said selected one of said first addition and said second addition, even if said estimate incorrectly identifies which of said product B*C and said operand A has a larger absolute value.

17. The data processing apparatus according to claim 16, wherein said estimation is based on a comparison of exponent values of said operand A and said product B*C.

18. A data processing apparatus for performing a fused multiply add operation on operands A, B and C to generate a result A+B*C, said operands A, B and C and said result A+B*C being floating point values, said data processing apparatus comprising:
  multiplying means for multiplying said operands B and C to generate a product B*C having a high order portion and a low order portion; and
  adding means for:
  (i) generating a first intermediate value by adding said operand A to said high order portion;
  (ii) generating a second intermediate value by adding said operand A to said low order portion;
  (iii) selecting one of said first intermediate value and said second intermediate value; and
  (iv) generating said result A+B*C by a selected one of a first addition and a second addition:
  (a) said first addition comprising adding said first intermediate value to said low order portion and being selected by said adding means if said first intermediate value is selected as said one of said first intermediate value and said second intermediate value; and
  (b) said second addition comprising adding said second intermediate value to said high order portion and being selected by said adding means if said second intermediate value is selected as said one of said first intermediate value and said second intermediate value.

19. A method for performing a fused multiply add operation on operands A, B and C to generate a result A+B*C, said operands A, B and C and said result A+B*C being floating point values, said method comprising the steps of:
  multiplying said operands B and C to generate a product B*C having a high order portion and a low order portion;
  generating a first intermediate value by adding said operand A to said high order portion;
  generating a second intermediate value by adding said operand A to said low order portion;
  selecting one of said first intermediate value and said second intermediate value; and
  generating said result A+B*C by a selected one of a first addition and a second addition:
  (a) said first addition comprising adding said first intermediate value to said low order portion and being selected as said selected one of said first addition and said second addition if said first intermediate value is selected as said one of said first intermediate value and said second intermediate value; and
  (b) said second addition comprising adding said second intermediate value to said high order portion and being selected as said selected one of said first addition and said second addition if said second intermediate value is selected as said one of said first intermediate value and said second intermediate value.

20. The method according to claim 19, wherein said method is performed using a data processing apparatus comprising adding circuitry;
  said adding circuitry generates said first intermediate value and said second intermediate value in a first pass through said adding circuitry and generates said result A+B*C in a second pass through said adding circuitry;

outputs generated in said first pass through said adding circuitry are forwarded for use as inputs for said second pass through said adding circuitry; and said adding circuitry comprises at least some circuitry that is used for both said first pass and said second pass.

21. The method according to claim 19, further comprising the step of rounding said result A+B*C to generate a rounded result value having an N-bit mantissa; wherein:

said first intermediate value includes an X-bit mantissa representing X high order bits of an M-bit mantissa representing a sum of said high order portion and said operand A, and a jamming bit indicative of whether any of M−X low order bits of said M-bit mantissa have a non-zero value, where M≧X and X≧N;

said second intermediate value includes an X-bit mantissa representing X high order bits of a P-bit mantissa representing a sum of said low order portion and said operand A, and a jamming bit indicative of whether any of P−X low order bits of said P-bit mantissa have a non-zero value, where P≧X; and said result A+B*C includes an X-bit mantissa representing X high order bits of a Q-bit mantissa representing said selected one of said first addition and said second addition, and a jamming bit indicative of whether there is a non-zero value for any of: (i) Q−X low order bits of said Q-bit mantissa; and (ii) said jamming bit of said selected one of said first intermediate value and said second intermediate value, where Q>X.

22. The method according to claim 19, wherein said selecting step selects said one of said first intermediate value and said second intermediate value in dependence on an estimation of whether said operand A and said high order portion have values such that addition of said operand A and said high order portion would result in cancellation of a plurality of high order bits of said operand A and said high order portion.

23. The method according to claim 22, wherein said selecting step selects as said one of said first intermediate value and said second intermediate value:

(i) said first intermediate value if it is estimated that said operand A and said high order portion have values such that addition of said operand A and said high order portion would result in cancellation of said plurality of high order bits of said operand A and said high order portion; and (ii) said second intermediate value if said operand A and said high order portion have values such that addition of said operand A and said high order portion would not result in cancellation of said plurality of high order bits of said operand A and said high order portion.

24. The method according to claim 19, wherein when said product B*C is a normalized floating point value having an exponent with an exponent value $E_{BC}$ and said operand A is a normalized floating point value having an exponent with an exponent value $E_A$, then said selecting step selects said one of said first intermediate value and said second intermediate value in dependence on whether or not an absolute difference between said exponent value $E_{BC}$ and said exponent value $E_A$ is greater than an exponent difference threshold.

25. The method according to claim 24, wherein said selecting step selects as said one of said first intermediate value and said second intermediate value:

(i) said first intermediate value if said absolute difference between said exponent value $E_{BC}$ and said exponent value $E_A$ is not greater than said exponent difference threshold; and (ii) said second intermediate value if said absolute difference between said exponent value $E_{BC}$ and said exponent value $E_A$ is greater than said exponent difference threshold.

26. The method according to claim 24, wherein said exponent difference threshold is equal to one.

27. The method according to claim 19, wherein said method is performed using a data processing apparatus comprising adding circuitry;

said first intermediate value is generated using a first processing path of said adding circuitry, and said second intermediate value is generated using a second processing path of said adding circuitry, said first processing path operating in parallel with said second processing path.

28. The method according to claim 27, wherein:

said first processing path performs a first alignment step of aligning said high order portion and said operand A, a first adding step of adding said high order portion and said operand A to generate said first intermediate value, and a first normalizing step of normalizing said first intermediate value;

said second processing path performs a second alignment step of aligning said low order portion and said operand A, a second adding step of adding said low order portion and said operand A to generate said second intermediate value, and a second normalizing step of normalizing said second intermediate value;

said first alignment step of said first processing path has a more limited alignment capability than said second alignment step; and said second normalizing step of said second processing path has a more limited normalizing capability than said first normalizing step.

29. The method according to claim 19, wherein:
said operands A, B and C each have an N-bit mantissa;
said product B*C has a 2N-bit mantissa; and
said high order portion and said low order portion each have an N-bit mantissa.

30. The method according to claim 29, wherein said operands A, B and C each have an X-bit exponent;

said product B*C, said high order portion and said low order portion each have an (X+1)-bit exponent;

said exponents of said product B*C and said high order portion each have a value E; and said exponent of said low order portion has a value equal to (E−N).

31. The method according to claim 19, wherein if one of said product B*C and said operand A represents a negative number, then the following steps are performed:

selecting, in dependence on an estimate of which of said product B*C and said operand A has a larger absolute value, a subtraction order from one of: product B*C minus operand A, and operand A minus product B*C;

generating said first intermediate value and said second intermediate value in accordance with said selected subtraction order; and performing said selected one of said first addition and said second addition using said selected one of said first intermediate value and said second intermediate value, said selected one of said first intermediate value and said second intermediate value being unchanged between being generated and being used for said selected one of said first addition and said second addition, even if said estimate incorrectly identifies which of said product B*C and said operand A has a larger absolute value.

32. The method according to claim 31, wherein said estimation is based on a comparison of exponent values of said operand A and said product B*C.

* * * * *